United States Patent
Lee et al.

(10) Patent No.: US 8,699,972 B2
(45) Date of Patent: Apr. 15, 2014

(54) TRANSMIT POWER CALIBRATION IN A COMMUNICATION SYSTEM

(71) Applicant: QUALCOMM Incorporated, San Diego, CA (US)

(72) Inventors: MeeLan Lee, Los Altos, CA (US); Wilson Fok, Milpitas, CA (US); David K. Su, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/677,265

(22) Filed: Nov. 14, 2012

(65) Prior Publication Data
US 2013/0122956 A1    May 16, 2013

Related U.S. Application Data

(60) Provisional application No. 61/560,101, filed on Nov. 15, 2011.

(51) Int. Cl.
*H04B 1/04* (2006.01)
*H01Q 11/12* (2006.01)

(52) U.S. Cl.
USPC .............. 455/127.1; 455/114.3; 455/126; 455/127.2; 455/127.4

(58) Field of Classification Search
USPC ............... 455/91, 114.2–115.1, 126–127.5
See application file for complete search history.

(56) References Cited

U.S. PATENT DOCUMENTS

| | | | |
|---|---|---|---|
| 6,236,863 B1 * | 5/2001 | Waldroup et al. | 455/522 |
| 6,272,322 B1 | 8/2001 | Su | |
| 6,567,653 B1 * | 5/2003 | Sanders | 455/126 |
| 6,587,514 B1 * | 7/2003 | Wright et al. | 375/296 |
| 6,597,514 B2 * | 7/2003 | Nishimura | 359/692 |
| 7,340,223 B1 * | 3/2008 | Wright et al. | 455/91 |
| 7,555,057 B2 * | 6/2009 | Staszewski et al. | 375/296 |
| 8,140,031 B2 | 3/2012 | Tsfati et al. | |
| 8,213,880 B2 | 7/2012 | Van Zelm et al. | |
| 2003/0002452 A1 | 1/2003 | Sahota | |

(Continued)

FOREIGN PATENT DOCUMENTS

GB    2390495 A    1/2004

OTHER PUBLICATIONS

International Search Report and Written Opinion—PCT/US2012/065309—ISA/EPO—Feb. 14, 2013.

(Continued)

*Primary Examiner* — Simon Nguyen
(74) *Attorney, Agent, or Firm* — DeLizio Gilliam, PLLC

(57) ABSTRACT

Functionality can be implemented to calibrate the output transmit power of a power amplifier of a network device without the use of test equipment. An RF signal can be transmitted at the saturated output power (of a power amplifier) from a transmitter unit to a receiver unit of the network device via a loopback path. A received power of the RF signal received via the loopback path can be measured. The loopback gain associated with the network device is determined based on the saturated output power and the measured received power. The output transmit power can be calibrated by iteratively decreasing the output transmit power by an unknown value, transmitting a new RF signal via the loopback path at the decreased output transmit power, measuring the new received power, and calculating the decreased output transmit power using the loopback gain and the measured new received power.

28 Claims, 4 Drawing Sheets

(56) References Cited

U.S. PATENT DOCUMENTS

| | | | |
|---|---|---|---|
| 2009/0004981 A1* | 1/2009 | Eliezer et al. | 455/127.1 |
| 2009/0286495 A1 | 11/2009 | Martikkala et al. | |
| 2009/0305742 A1 | 12/2009 | Caballero et al. | |
| 2010/0159848 A1* | 6/2010 | Rozenblit et al. | 455/73 |
| 2010/0189193 A1* | 7/2010 | Miura | 375/308 |
| 2011/0140777 A1* | 6/2011 | Drogi et al. | 330/127 |
| 2011/0222630 A1 | 9/2011 | Suzuki et al. | |
| 2012/0034893 A1* | 2/2012 | Baxter et al. | 455/234.1 |
| 2012/0282869 A1* | 11/2012 | Southcombe et al. | 455/127.1 |

OTHER PUBLICATIONS

Co-pending U.S. Appl. No. 61/560,101, filed Nov. 14, 2011, pp. 15.

\* cited by examiner

TRANSMIT POWER CALIBRATION IN A COMMUNICATION SYSTEM

RELATED MATTERS

This application claims the priority benefit of U.S. Provisional Application No. 61/560,101 filed on Nov. 15, 2011.

BACKGROUND

Embodiments of the inventive subject matter generally relate to the field of communication networks and, more particularly, to transmit power calibration in a communication system.

For proper operation, communications systems typically require an absolute transmit power level. For example, the pre-determined absolute transmit power level for a wireless local area network (WLAN) communication system may be set to a power level in the range of 10 dBm to 20 dBm for proper WLAN communication. Typically, the transmit power level is calibrated using additional test equipment such as a power meter.

SUMMARY

Various embodiments of a mechanism for transmit power calibration in a communication system are disclosed. In one embodiment, a saturated output power associated with a power amplifier of a communication network device is determined. The saturated output power is a maximum power level associated with the power amplifier and the communication network device is configured to operate in accordance with a first operating parameter. A radio frequency (RF) signal at the saturated output power is provided via a loopback path that couples a transmitter unit and a receiver unit of the communication network device. A received power of the RF signal received via the loopback path is measured. A first loopback gain associated with the communication network device is determined based, at least in part, on the saturated output power and the received power of the RF signal received via the loopback path. The first loopback gain is associated with the first operating parameter in accordance with which the communication network device is configured to operate. An output transmit power of the power amplifier is calibrated when the communication network device is configured to operate in accordance with the first operating parameter based, at least in part, on the loopback gain associated with the communication network device. A second loopback gain associated with a second operating parameter when the communication network device is configured to operate in accordance with the second operating parameter. A gain difference is determined between the first loopback gain associated with the first operating parameter and the second loopback gain associated with the second operating parameter. The output transmit power of the power amplifier is calibrated when the communication network device is configured to operate at the second operating parameter based, at least in part, on the gain difference and the calibrated output transmit power of the power amplifier when the communication network device is configured to operate at the first operating parameter.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
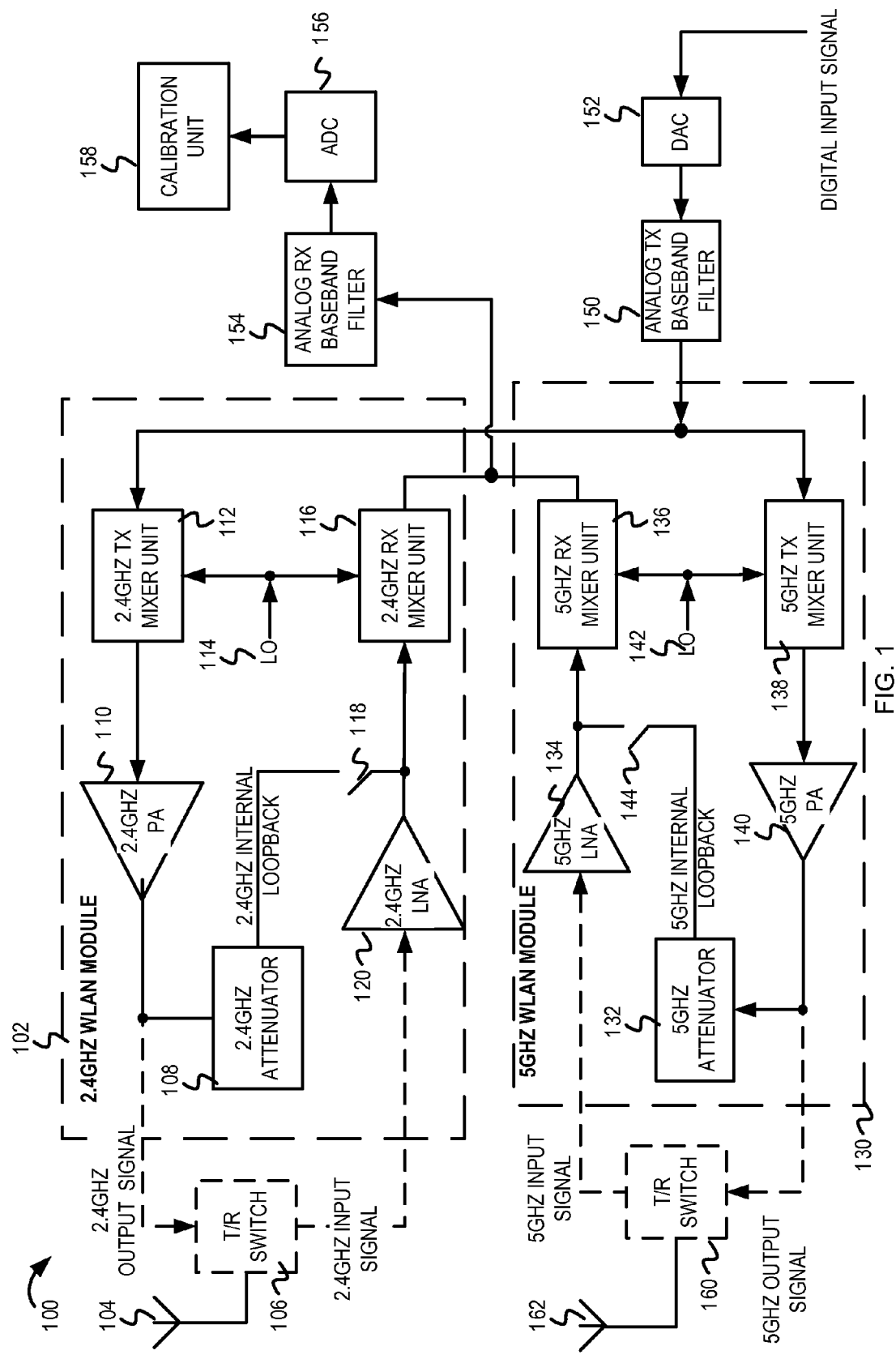
FIG. 1 is a block diagram illustrating an example mechanism for calibrating the output transmit power of a WLAN communication device.

The description that follows includes exemplary systems, methods, techniques, instruction sequences, and computer program products that embody techniques of the present inventive subject matter. However, it is understood that the described embodiments may be practiced without these specific details. For instance, although examples refer to transmit power calibration for wireless local area network (WLAN) devices (e.g., 802.11 compatible devices), embodiments are not so limited. In other embodiments, the transmit power calibration techniques described herein can be executed by network devices that implement other suitable communication protocols and standards (e.g., WiMAX). In other instances, well-known instruction instances, protocols, structures, and techniques have not been shown in detail in order not to obfuscate the description.

Currently, the transmit power at which a radio frequency (RF) signal can be transmitted ("target transmit power") is calibrated using a power meter or other suitable test equipment. For example, the output transmit power of a WLAN communication system may be measured in a test environment (e.g., using the test equipment) and the measured output transmit power may be compared against the target transmit power (or the requisite transmit power) to determine how much additional power should be added (or subtracted) to attain the target transmit power. Existing techniques for calibrating the output transmit power based on analyzing the measured output transmit power of the WLAN communication system typically require sophisticated test equipment (e.g., test equipment in manufacturing environments) and rely on the test environment having the same operating conditions as the environment in which the WLAN communication system will be deployed. Furthermore, the existing techniques can be expensive, labor intensive, and time consuming.

In some embodiments as will be described below, a calibrated output transmit power can be established without the use of any test equipment. Instead, the output transmit power calibration techniques described herein may utilize characteristics of the power amplifiers (PA) of the WLAN communication system. For example, the saturated output power (also referred to as the maximum output power) of a power amplifier may be utilized to calibrate the output transmit power because the saturated output power typically does not vary from one WLAN communication system to another. The saturated output power ($P_{SAT}$) remains relatively constant from system to system because it is a function of: 1) the reference supply voltage ($V_{dd}$) supplied to the WLAN communication system and 2) the equivalent load ($R_{equivalent}$) as "seen" by the power amplifier. The reference supply voltage and the equivalent load of the power amplifier can be well controlled quantities and can have very low manufacturing tolerances. As a result, the standard deviation of the saturated output power of the power amplifier can be very small (e.g., typically less than 1 dB). Knowledge of the saturated output power ($P_{SAT}$) can be used to calibrate the receive chain and to develop a basis to monitor the output transmit power. More specifically, an RF signal can be transmitted at the saturated output power (i.e., the maximum output power) from a transmitter unit to a receiver unit of the WLAN communication system via a loopback path. The received power of the received loopback signal can be measured and the loopback gain of the WLAN communication system can be determined based on the saturated output power and the measured power of the received loopback signal. To calibrate the output transmit power, the transmit power can be decreased from the maximum output power by a suitable value (which may or may not be accurately known) so that the power amplifier is operating in approximately the desired output range. The RF signal from the power amplifier (at the decreased transmit power level) can be looped back to the receiver and the new received power can be measured (at the receiver). This transmit power can be calculated using the loopback gain and the new received power. The transmit power can be incrementally reduced and these operations can be iteratively executed to determine and calibrate the transmit power at each iteration. The calibration technique utilizing characteristics of the power amplifier can eliminate the use of test equipment thereby reduces the test/calibration complexities.

FIG. 1 is a block diagram illustrating an example mechanism for calibrating the output transmit power of a WLAN communication device 100. The WLAN communication device 100 comprises a 2.4 GHz WLAN module 102 and a 5 GHz WLAN module 130. The 2.4 GHz WLAN module 102 may comprise a transmitter (TX) unit including a 2.4 GHz TX mixer unit 112 and a 2.4 GHz power amplifier (PA) 110. The 2.4 GHz WLAN module 102 may also comprise a receiver (RX) unit including a 2.4 GHz RX mixer unit 116 and a 2.4 GHz low noise amplifier (LNA) 120. In some implementations, the output of the 2.4 GHz PA 110 can be looped back to the receiver unit of the 2.4 GHz WLAN module 102 via a 2.4 GHz internal loopback path. More specifically, the output of the 2.4 GHz PA 110 may be an input to a 2.4 GHz attenuator 108 (e.g., a capacitive attenuator) and the output of the 2.4 GHz attenuator 108 may be coupled via a switch 118 to the 2.4 GHz RX mixer unit 116. In some implementations, the output of the 2.4 GHz PA 110 can be looped back to the receiver unit of the 2.4 GHz WLAN module 102 via a loopback path external to the 2.4 GHz WLAN module 102. As depicted in FIG. 1 by dashed lines, the output of the 2.4 GHz PA 110 and the input of the 2.4 GHz LNA 120 are coupled via a transmit/receive (T/R) switch 106 (also depicted by dashed lines). The T/R switch 106 may be coupled with an antenna 104 that may be shared by the transmitter unit and the receiver unit of the 2.4 GHz WLAN module 102. In some embodiments, the external loopback path may be generated by a circuit board (e.g., on which the WLAN communication device 100 is implemented) that couples the output of the 2.4 GHz PA 110 to the input of the 2.4 GHz LNA 120 (which may be switched ON or OFF).

Likewise, the 5 GHz WLAN module 130 may comprise a transmitter unit including a 5 GHz TX mixer unit 138 and a 5 GHz PA 140. The 5 GHz WLAN module 130 may also comprise a receiver unit including a 5 GHz RX mixer unit 136 and a 5 GHz LNA 134. The 5 GHz LNA 134 can receive a loopback signal (or a feedback signal) received from the transmitter unit (e.g., the output of the 5 GHz PA 140) via an internal or external loopback path. As similarly discussed above with reference to the 2.4 GHz WLAN module 102, the 5 GHz WLAN module 130 can also implement various types of mechanisms to provide the output of the 5 GHz PA 140 to the receiver unit of the 5 GHz WLAN module 130. For example, as depicted in FIG. 1, the output of the 5 GHz PA 140 can be looped back to the receiver unit of the 5 GHz WLAN module 130 via a 5 GHz internal loopback path. More specifically, the output of the 5 GHz PA 140 may be an input to a 5 GHz attenuator 132 (e.g., a capacitive attenuator) and the output of the 5 GHz attenuator 132 may be coupled via a switch 144 to the 5 GHz RX mixer unit 136. In FIG. 1, the 5 GHz WLAN module 130 may also implement a T/R switch 160 (also depicted by dashed lines) that couples the output of the 5 GHz PA 140 to the input of the 5 GHz LNA 134. The T/R switch 162 may be coupled with an antenna 162 that may be shared by the transmitter unit and the receiver unit of the 5 GHz WLAN module 130. In some embodiments, the external loopback path may be generated by a circuit board (e.g., on which the WLAN communication device 100 is implemented) that couples the output of the 5 GHz PA 140 to the input of the 5 GHz LNA 134 (which may be switched ON or OFF).

The WLAN communication device 100 can also comprise a digital to analog converter (DAC) 152 for converting a digital input signal from a source device (e.g., digital baseband block, digital test block, digital signal generator, etc.), to an analog signal for transmission (e.g., after filtering, amplification, etc.). The DAC 152 may be coupled to an analog TX baseband filter 150. The analog TX baseband filter 150 may be coupled to the 2.4 GHz TX mixer unit 112 and the 5 GHz TX mixer unit 138. In some implementations, a switching device (not shown) can selectively couple the 2.4 GHz TX mixer unit 112 or the 5 GHz TX mixer unit 138 to the analog TX baseband filter 150 depending on whether the 2.4 GHz WLAN module 102 or the 5 GHz WLAN module 130 is enabled. The 2.4 GHz RX mixer unit 116 and the 5 GHz RX mixer unit 136 may be coupled to an analog RX baseband filter 154. In some implementations, a switching device (not shown) can selectively couple the 2.4 GHz RX mixer unit 116 or the 5 GHz RX mixer unit 136 to the analog RX baseband filter 154 depending on whether the 2.4 GHz WLAN module 102 or the 5 GHz WLAN module 130 is enabled. The analog RX baseband filter 154 may be coupled to an analog to digital converter (ADC) 156. The ADC 156, in turn, may be coupled to a calibration unit 158. In some embodiments, the calibration unit 158 can be a digital baseband receiver, or a digital test circuit that can measure the received power (e.g., a received signal strength). The calibration unit 158 can execute operations described below in FIGS. 2-3 to measure the received power at the output of the ADC 156 and to calibrate the output transmit power of the power amplifier (e.g., the 2.4 GHz PA 110 and/or the 5 GHz PA 140). The calibration operations will be described below with reference to the 2.4 GHz WLAN module 102. It is noted, however, that the calibration operations can also be extended to the 5 GHz WLAN module 130.

The power amplifier is first configured to deliver the saturated output power ($P_{SAT}$). In one example, the 2.4 GHz PA 110 is driven to $P_{SAT}$ with a 5 MHz sinusoid tone. The absolute value of $P_{SAT}$ for a given design can be determined through characterization. For example, the power amplifier (e.g., the 2.4 GHz PA 110) can be analyzed and tested in a test environment (as a standalone component and/or in a test circuit) to determine the saturated output power associated with the power amplifier (e.g., the maximum output power that can be delivered by the power amplifier). As another example, $P_{SAT}$ can be determined using test equipment (e.g., a power meter, a spectrum analyzer, a power measuring equipment, etc.), a test circuit, or other suitable techniques. The test circuit may be another device that can measure received power in response to the 2.4 GHz PA 110 transmitting a test signal at the saturated output power $P_{SAT}$. The saturated output power $P_{SAT}$ can then be estimated based, at least in part, on the measured received power. It is noted that the test equipment and the test circuit can measure the power through cables or over the air.

Next, the transmitted power is coupled to the receiver unit. In other words, a radio frequency (RF) signal is transmitted at the saturated output power ($P_{SAT}$) and this RF signal is looped back (or fed back) to the receiver unit of the WLAN communication device 100. The transmitted signal when received at the receiver unit (after loopback) is herein referred to as the "loopback signal." Various techniques can be employed to couple the transmitted RF signal to the receiver unit. In one example, the 2.4 GHz WLAN module 102 can comprise an internal dedicated loopback path (with attenuation) between the 2.4 GHz PA 110 of the transmitter unit and the 2.4 GHz LNA 120 of the receiver unit. In this example, the RF signal can be provided from the 2.4 GHz PA 110 to the 2.4 GHz attenuator 108 and the 2.4 GHz attenuator 108 can provide the loopback signal to the 2.4 GHz RX mixer unit 116 via the switch 118. As another example, the transmitted power can be coupled with the receiver unit by configuring the receiver unit to sense the leakage power through the T/R switch 106 set to the transmitter or receiver units. In this example, the RF signal can be transmitted via the 2.4 GHz PA 110 and the T/R switch 106 can provide attenuation and loop the signal back to the receiver unit, as depicted in FIG. 1 by dashed lines. In some embodiments, the T/R switch 106 can be an external switching device. More specifically, as depicted in the 2.4 GHz WLAN module 102, the transmitter unit (comprising the 2.4 GHz PA 110 and the 2.4 GHz TX mixer unit 112), and the receiver unit (comprising the 2.4 GHz LNA 120 and the 2.4 GHz RX mixer unit 116) share a common antenna 104. The T/R switch 106 can control access to the shared antenna 104 and whether transmitter unit or the receiver unit can utilize the antenna 104 for transmitting signals or receiving signals respectively. To use the T/R switch 106 to couple the transmitted signal to the receiver unit, the T/R switch 106 can be configured in a transmit mode. When the 2.4 GHz PA 110 is driven to $P_{SAT}$ (e.g., transmits the RF signal at the saturated output power) and the T/R switch 106 is configured in the transmit mode, some of the output power (transmitted by the 2.4 GHz PA 110) may leak into the input of the 2.4 GHz LNA 120. As will be described below, this leakage power can be measured and can be used to calibrate the loopback gain. In some implementations, the gain associated with the receiver unit (e.g., the 2.4 GHz LNA 120, the 2.4 GHz RX mixer unit 116, and the analog RX baseband filter 154) can be adjusted (e.g., set to a lowest gain setting) to ensure proper reception of the loopback signal and to maintain linearity at the output of the ADC 156. Further, the T/R switch 106 can also provide attenuation (e.g., 20 dB-30 dB of attenuation) into the receive port of the receiver unit to ensure that the loopback signal does not saturate and damage the receiver unit. Although in various implementations the T/R switch 106 can be an external switching device, in some implementations the T/R switch 106 may be implemented as an internal switching device.

In some embodiments, the transmitter unit and the receiver unit of the 2.4 GHz WLAN module 102 may be associated with a transmit antenna and a receive antenna respectively. In this embodiment, the transmitted power can be coupled with the receiver unit by sensing (at the receive antenna) the output power transmitted from the transmit antenna. The RF signal can be transmitted (at the saturated output power) via the transmit antenna, can travel through the communication medium (e.g., air), and can be received by the receive antenna. In this example, transmitting the signal via the communication medium (e.g., air) can serve to attenuate the transmitted signal before the signal is received at the receive antenna and the receiver unit.

The gain associated with the receiver unit can be adjusted so that the processing components of the receiver unit (e.g., the 2.4 GHz LNA 120, the 2.4 GHz RX mixer unit 116, the analog RX baseband filters 154, the ADC 156, etc.) operate in the linear region (e.g., so that the processing components of the receiver unit can properly receive and process the loopback signal). Adjusting the gain associated with the receiver unit can comprise varying the gain of the 2.4 GHz attenuator 108 (e.g., the capacitive attenuator), the 2.4 GHz RX mixer unit 116, and/or the analog RX baseband filter 154. In some implementations, because the saturated output power ($P_{SAT}$) is very high, the loopback signal received via the 2.4 GHz PA 110 can be much higher as compared to the power levels at which the processing components of the receiver unit are configured to operate. In other words, the processing components of the receiver unit may not be designed to handle the high $P_{SAT}$ power levels. In some implementations, isolation techniques can be employed to ensure the receiver unit is operating in the linear region. To avoid saturation of the processing components of the receiver unit, the loopback signal may be attenuated before being provided to the 2.4 GHz LNA 120. In some implementations as depicted in FIG. 1, the 2.4 GHz attenuator 108 (e.g., a variable capacitive attenuator) can attenuate the output of the 2.4 GHz PA 110. The output of the 2.4 GHz attenuator 108 can be provided to the 2.4 GHz RX mixer unit 116. Thus, three inputs can be provided to the 2.4 GHz RX mixer unit 116—the loopback signal at the output of the 2.4 GHz attenuator 108, the loopback signal at the output of the 2.4 GHz LNA 120 (received via the loopback path and the T/R switch 106), and a local oscillator (LO) signal 114. The output of the 2.4 GHz RX mixer unit 116 is provided to the analog RX baseband filter 154 and then to the ADC 156. The ADC 156 can typically have a very high resolution and can generate an accurate sample of the loopback signal. After initial processing (e.g., amplification, down-conversion, filtering, etc.) of the loopback signal, the ADC 156 can convert the loopback signal from the analog domain into the digital domain. The calibration unit 158 can measure the signal power ($P_{RX}$) of the loopback signal ("received power") at the output of the ADC 156 and can use the measured received power to determine the receive unit gain (also referred to herein as "loopback gain"). The loopback gain (LoopbackGain) can be calculated as the ratio of the received power ($P_{RX}$) and the saturated output power ($P_{SAT}$), as depicted in Eq. 1. The loopback gain can be stored at a predetermined memory location on the on-chip memory (or other suitable non-volatile memory).

$$\text{LoopbackGain} = P_{RX}/P_{SAT} \qquad \text{Eq. 1}$$

In some implementations as described above, a first received power measurement ($P_{RX}$) can be determined when an RF signal is transmitted at the saturated output power ($P_{SAT}$). The loopback gain (LoopbackGain) associated with the WLAN communication device 100 can be determined in accordance with Eq. 1. Next, the output transmit power of the 2.4 GHz PA 110 can be reduced to generate a second RF signal that is transmitted at the reduced output transmit power ($P_{OUT}$). Accordingly, a second loopback signal can be received and processed as described above. The calibration unit 158 can determine a second received power measurement ($P_{RX2}$) based on the second loopback signal. It is noted that the reduced output transmit power ($P_{OUT}$) may be unknown and so may need to be calibrated. The output transmit power ($P_{OUT}$) can be calculated based on the second received power measurement ($P_{RX2}$) and the loopback gain (LoopbackGain) based on the saturated output power, as depicted in Eq. 2.

$$P_{OUT} = P_{RX2}/\text{LoopbackGain} \quad \text{Eq. 2}$$

Thus, by assuming that the saturated output power $P_{SAT}$ and the loopback gain are constant in the 2.4 GHz WLAN module 102, the output transmit power levels can be calibrated by incrementally and iteratively adjusting the output transmit power, measuring the corresponding received power at the output of the ADC 156, and calculating the corresponding output transmit power level in accordance with Eq. 2.

In some implementations, as will be further described below, the loopback calibration mechanism described herein can be employed to determine gain steps in the receiver unit and/or the transmitter unit. As depicted in FIG. 1, the WLAN communication device 100 is a dual-band system comprising the 2.4 GHz WLAN module 102 and the 5 GHz WLAN module 130. Although FIG. 1 depicts that all of the 2.4 GHz processing components are separate from the 5 GHz processing components, embodiments are not so limited. In some implementations, the 2.4 GHz WLAN module 102 and the 5 GHz WLAN module 130 can share some/all the processing components except the TX mixer unit, the RX mixer unit, and the attenuator. In other words, the 2.4 GHz WLAN module 102 and the 5 GHz WLAN module 130 can share a common baseband filter, ADC, DAC, and/or other baseband processing components. To switch between the 2.4 GHz WLAN module 102 and the 5 GHz WLAN module 130, the appropriate TX mixer units, RX mixer units, and capacitive attenuators can be switched into the circuitry. In general, the capacitive attenuator can be tightly controlled and very accurate, and may produce an attenuation that has little or no deviation from the set attenuation value (e.g., because the ratio of capacitors on silicon can be very tightly controlled). In other words, if the capacitive attenuator is configured to provide a 10 dB attenuation, the attenuation level provided by the capacitive attenuator will typically not deviate (or may deviate by a very negligible value) from the set 10 dB attenuation level. Likewise, the gain associated with the baseband processing components (e.g., the baseband filters, the ADC, the DAC, etc.) can be well controlled and suffers little or no variation. In contrast, the gain of the RF mixer units ("mixer gain") may not be very accurate. Thus, any difference in the loopback gain associated with the 2.4 GHz WLAN module 102 and the loopback gain associated with the 5 GHz WLAN module 130 can be attributed to differences in the 2.4 GHz mixer gain and the 5 GHz mixer gain. The gain difference between the 2.4 GHz mixer units 112 and 116 and 5 GHz mixer units 136 and 138 can be calibrated by swapping the 2.4 GHz TX mixer unit 112 with the 5 GHz TX mixer unit 138, swapping the 2.4 GHz RX mixer unit 116 with the 5 GHz RX mixer unit 136, and measuring the loopback gain. In one example, the 2.4 GHz WLAN module 102 can be enabled (and the 5 GHz WLAN module 130 can be disabled) and the loopback gain associated with the 2.4 GHz WLAN module 102 can be determined as described above using Eq. 1. Next, the 2.4 GHz WLAN module 102 can be disabled, the 5 GHz WLAN module 130 can be enabled, and the loopback gain associated with the 5 GHz WLAN module 130 can be determined. As discussed above, the loopback gain associated with the 5 GHz WLAN module 130 can be determined based, at least in part, on the saturated output power associated with the 5 GHz PA 140. An indication of the gain difference between the 2.4 GHz WLAN module 102 and the 5 GHz WLAN module 130 can be stored at a predetermined memory location. The gain difference between the loopback gain of the 2.4 GHz WLAN module 102 and the loopback gain of the 5 GHz WLAN module 130 can be attributed to the gain difference between the 2.4 GHz RX mixer gain and the 5 GHz RX mixer gain and/or the gain difference between the 2.4 GHz TX mixer gain and the 5 GHz TX mixer gain. The output transmit power of the 2.4 GHz WLAN module 102 can then be calibrated in accordance with the operations described above. The output transmit power of the 5 GHz WLAN module 130 can be calibrated based on the gain difference and the calibrated output transmit power of the 2.4 GHz WLAN module 102. Furthermore, in some implementations, the gain of one or more of the processing units can be varied to vary the loopback gain as desired.

Figure 2:
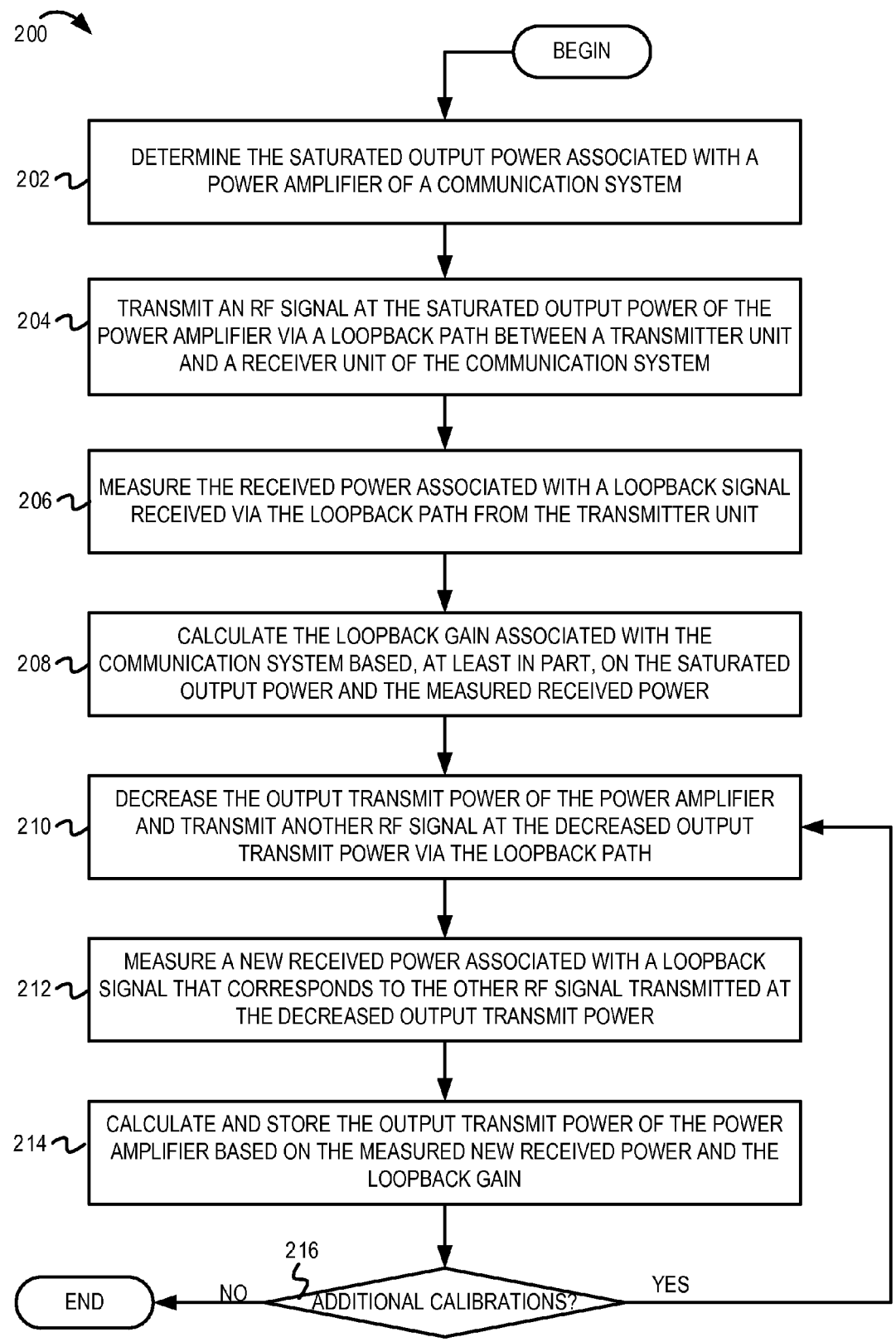
FIG. 2 is a flow diagram illustrating example operations for calibrating the transmit power of a power amplifier of a communication system.

FIG. 2 is a flow diagram ("flow") 200 illustrating example operations for calibrating the transmit power of a power amplifier of a communication system. The flow 200 begins at block 202.

At block 202, the saturated output power associated with a power amplifier of a communication system is determined. For example, the power amplifier (e.g., the 2.4 GHz PA 110) is first configured to deliver the saturated output power ($P_{SAT}$). In other words, the power amplifier can be configured to operate at its maximum setting and to deliver the maximum possible power. The flow continues at block 204.

At block 204, a radio frequency (RF) signal is transmitted at the saturated output power of the power amplifier via a loopback path between a transmitter unit and a receiver unit of the communication system. With reference to the example of FIG. 1, the 2.4 GHz PA 110 can transmit the RF signal at the saturated output power and this RF signal (i.e., the transmitted power) is looped back (or fed back) to the receiver unit of the WLAN communication device 100 to couple the transmitted power to the receiver unit. The transmitted RF signal when received at the receiver unit (after loopback) is referred to as the "loopback signal." As described above, various techniques can be employed to establish the loopback path and to couple the receiver unit with the transmitter unit of the WLAN communication system (e.g., the 2.4 GHz WLAN module 102). In one embodiment, the 2.4 GHz WLAN module 102 may comprise a dedicated loopback path (with attenuation) that couples the transmitter unit with the receiver unit. For example, a physical wire (or a metal interconnect on an integrated circuit) may be used to connect the transmitter unit with the receiver unit. In the example of FIG. 1, the RF signal is provided from the transmitter unit to the receiver unit of the 2.4 GHz WLAN module 102 via a 2.4 GHz attenuator 108 and a switch 118. In another embodiment, the RF signal can be transmitted from the 2.4 GHz PA 110 and the leakage power can be detected/received at the receiver unit via a T/R switch 106. The T/R switch 106 can be an internal switch or an external switch. In another embodiment, the RF signal can be transmitted by the transmitter unit from a transmit antenna and can be received (as the loopback signal) by a receive antenna of the receiver unit. Transmitting the RF signal (instead of directly coupling the RF signal to the receiver unit) can preclude the need for additional attenuation units. The flow continues at block 206.

At block 206, the received power associated with the loopback signal is measured. In some embodiments, the gain associated with the receiver unit can be adjusted so that the processing components of the receiver unit (e.g., the 2.4 GHz LNA 120, the 2.4 GHz RX mixer unit 116, the analog RX baseband filters 154, the ADC 156, etc.) operate in the linear region (e.g., so that the processing components of the receiver unit can properly receive and process the loopback signal). The linear region can refer to a range of power values where the receiver unit can properly receive and process the loopback signal and where the loopback signal is not compressed/distorted. After initial processing (e.g., amplification, downconversion, filtering, etc.) of the loopback signal, the ADC 156 can convert the loopback signal into the digital domain. The calibration unit 158 can measure the received power ($P_{RX}$) of the loopback signal at the output of the ADC 156. The flow continues at block 208.

At block 208, the loopback gain associated with the communication system is calculated based, at least in part, on the saturated output power and the measured received power. For example, the calibration unit 158 can calculate the loopback gain (or loss) as the ratio of the received power (determined at block 206) and the saturated output power (determined at block 202), as depicted in Eq. 1. In other words, LoopbackGain (or LoopbackLoss)=$P_{RX}/P_{SAT}$. The loopback gain associated with the communication system (e.g., the 2.4 GHz WLAN module 102) can be stored in software, on-chip memory, an external storage device, etc. The flow continues at block 210.

At block 210, the output transmit power of the power amplifier is decreased and another RF signal is transmitted at the decreased output transmit power via the loopback path. The output transmit power $P_{OUT}$ of the 2.4 GHz PA 110 can be reduced (to an unknown, uncalibrated value). Another RF signal can be transmitted at the reduced output transmit power $P_{OUT}$ from the transmitter unit to the receiver unit, as described above with reference to block 204. It is noted that the operations described below with reference to blocks 210-214 can be iteratively executed to calibrate the output transmit power of the 2.4 GHz PA 110 (and the 2.4 GHz WLAN module 102). The flow continues at block 212.

At block 212, a new received power associated with a loopback signal that corresponds to the other RF signal previously transmitted the decreased output transmit power is measured. As discussed above with reference to block 206, the receiver unit can receive another loopback signal in response to the RF signal transmitted at the reduced output transmit power $P_{OUT}$. The calibration unit 158 can determine the new received power measurement ($P_{RX2}$) based on the received loopback signal. The flow continues at block 214.

At block 214, the output transmit power of the power amplifier is calculated based on the measured new received power and the loopback gain. The reduced output transmit power $P_{OUT}$ can be calculated based on the new received power measurement ($P_{RX2}$) determined at block 212 and based on the loopback gain determined at block 208. Specifically, as discussed above with reference to Eq. 2, the reduced output transmit power $P_{OUT}$ can be calculated as $P_{OUT}=P_{RX2}/$ LoopbackGain. The flow continues at block 216.

At block 216, it is determined whether to perform additional calibrations for calibrating the output transmit power. If it is determined to perform additional calibrations for calibrating the output transmit power, the flow 200 loops back to block 210 where the output transmit power of the power amplifier is further decreased, an RF signal is transmitted via the loopback path at the decreased output transmit power, and the output transmit power is calculated (in accordance with Eq. 2) based on the measured received power and the loopback gain. After it is determined that the output transmit power calibration process is completed, the flow ends.

Figure 3:
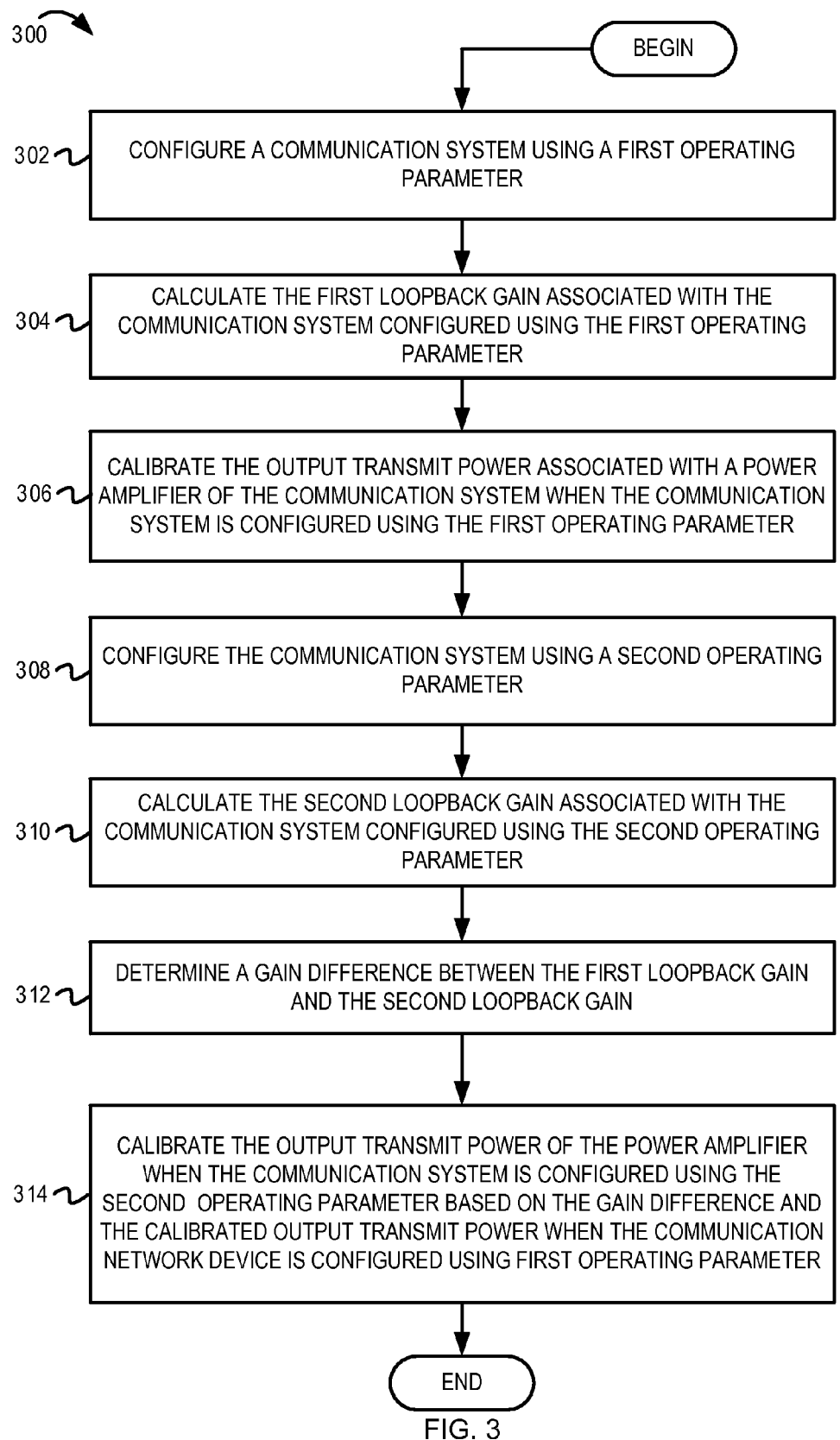
FIG. 3 is a flow diagram illustrating example operations for calibrating the output power associated with a power amplifier using different sets of operating parameters.

FIG. 3 is a flow diagram 300 illustrating example operations for calibrating the output power associated with a power amplifier using different operating parameters. The flow begins at block 302.

At block 302, a communication system is configured using a first operating parameter. The first operating parameter can include an operating frequency band, an operating temperature, a modulation scheme, and/or other suitable operating parameters. With reference to the example WLAN communication device 100 of FIG. 1, the 2.4 GHz WLAN module can be enabled and the 5 GHz WLAN module 130 can be disabled. The flow continues at block 304.

At block 304, the loopback gain ("first loopback gain") associated with the communication system configured using the first operating parameter is calculated. As discussed above with reference to blocks 202-208 of FIG. 2, the first loopback gain can be determined when the communication system configured using the first operating parameter. For example, when the 2.4 GHz WLAN module is enabled, the saturated output power associated with the power amplifier (e.g., the 2.4 GHz PA 110) can be determined. An RF signal can be transmitted at the saturated output power (at the first operating parameter) from the transmitter unit to the receiver unit via the loopback path. The received power associated with the RF signal transmitted at the saturated output power (at the first operating parameter) can be measured. The first loopback gain can be calculated as a ratio of the measured received power to the saturated output power at the first operating parameter. The flow continues at block 306.

At block 306, the output transmit power associated with a power amplifier is calibrated when the communication system is configured using the first operating parameter. As discussed above with reference to blocks 210-216 of FIG. 2, the calibration unit 158 can calibrate the output transmit power associated with the 2.4 GHz PA 110 when the WLAN communication device 100 is configured using the first operating parameter (e.g., when the 2.4 GHz WLAN module 102 is enabled and the 5 GHz WLAN module 130 is disabled). The flow continues at block 308.

At block 308, the communication system is configured using a second operating parameter. As discussed above, the second operating parameter can include an operating frequency band, an operating temperature, a modulation scheme, and/or other suitable operating parameters. In some embodiments, only one of the operating parameters of the communication system may be varied. For example, it may be determined to calibrate the transmit power in light of a variation in operating frequency. In other embodiments, more than one of the operating parameters of the communication system may be varied. For example, it may be determined to calibrate the transmit power in light of a variation in operating frequency and operating temperature. With reference to the example of FIG. 1, the operating frequency of the communication system may be changed from 2.4 GHz (i.e., the first operating parameter) to 5 GHz (i.e., the second operating parameter). In this example, the 2.4 GHz WLAN module 102 may be disabled and the 5 GHz WLAN module 130 can be enabled. The flow continues at block 310.

At block 310, the loopback gain ("second loopback gain") associated with the communication system configured using the second operating parameter is calculated. As discussed above with reference to blocks 202-208 of FIG. 2, the second loopback gain can be determined when the communication system configured using the second operating parameter. For example, after the operating frequency is changed from 2.4 GHz to 5 GHz, the saturated output power associated with the power amplifier (e.g., the 5 GHz PA 140) can be determined. An RF signal can be transmitted at the saturated output power (at the second operating parameter) from the transmitter unit to the receiver unit via the loopback path. The received power associated with the RF signal transmitted at the saturated output power (at the second operating parameter) can be measured. The second loopback gain can be calculated as a ratio of the measured received power to the saturated output power at the second operating parameter. The flow continues at block 312.

At block 312, a gain difference between the first loopback gain and the second loopback gain is determined. For example, the calibration unit 158 can determine the gain difference between the first loopback gain associated with the first operating parameter and the second loopback gain associated with the second operating parameter. With reference to the example of FIG. 1, the calibration unit 158 can determine the gain difference between the first loopback gain associated with the 2.4 GHz WLAN module 102 and the second loopback gain associated with the 5 GHz WLAN module 130. The flow continues at block 314.

At block 314, the output transmit power of the power amplifier is calibrated when the communication system is configured using the second operating parameter based on the gain difference and the calibrated output transmit power of the power amplifier when the communication network device is configured to operate at the first operating parameter. In other words, the transmit power for the second operating parameter (e.g., the transmit power for the 5 GHz WLAN module 130) can be calibrated by applying a gain correction to the previously calibrated transmit power for the first operating parameter (e.g., the transmit power for the 2.4 GHz WLAN module). For example, for each output transmit power level that was calibrated for the 2.4 GHz WLAN module 102, a corresponding output transmit power level for the 5 GHz WLAN module 130 can be determined by multiplying the output transmit power level for the 2.4 GHz WLAN module 102 by the gain difference. From block 314, the flow ends.

It should be understood that FIGS. 1-3 and the operations described herein are examples meant to aid in understanding embodiments and should not be used to limit embodiments or limit scope of the claims. Embodiments may perform additional operations, fewer operations, operations in a different order, operations in parallel, and some operations differently. It is noted that although FIG. 3 describes operations for using the transmit power calibrated for the first operating parameter to calibrate the transmit power for the second operating parameter, embodiments are not so limited. In other embodiments, the transmit power can be calibrated for a first set of operating parameters and the calibrated transmit power can be used to calibrate the transmit power for the second set of operating parameters. The first and the second sets of operating parameters can each comprise an operating frequency band, an operating temperature, a modulation scheme, and/or other suitable operating parameters. Furthermore, in switching from the first set of operating parameters to the second set of operating parameters, only a subset of the operating parameters in the first set of operating parameters may be modified. For example, the first set of operating parameters may comprise a first operating frequency band and an operating temperature. The second set of operating parameters may comprise a second operating frequency band and the operating temperature (left unchanged).

It is noted that although the Figures describe operations for incrementally reducing the transmit power to calibrate the transmit power at each iteration, embodiments are not so limited. In other embodiments, the transmit power maybe varied randomly or in a predetermined pattern. For example, the transmit power may be increased as long as the transmit power does not exceed the saturated output power. The transmit power (i.e., the increased transmit power) can be calibrated using the corresponding received power value and the loopback gain as described above.

Although examples refer to a calibration process for calibrating the output transmit power of a WLAN communication device, embodiments are not so limited. In other embodiments, the operations described above can also be employed to determine a transmit power at which to communicate with another communication device. For example, the WLAN communication device 100 may be communicating with a second WLAN communication device in a communication network. The 2.4 GHz LNA may receive an RF signal from the second WLAN communication device. After initial processing and conversion to the digital domain, the calibration unit 158 can determine the received power associated with the RF signal received from the second WLAN communication device. The calibration unit 158 can then use Eq. 2 to determine the corresponding output transmit power at which to transmit a response to the second WLAN communication device.

It is also noted that although embodiments describe operations for calibrating the transmit power by successively providing (via the loopback path) a plurality of RF signals at incrementally decreasing output transmit powers (discussed in FIG. 2) or based on receiving a measured power from another communication device, embodiments are not so limited. In other embodiments, the transmit power calibration operations described above can also be employed for transmit power control (e.g., to ensure that the WLAN communication device 100 transmits signals at an optimal transmit power).

It is noted that the output transmit power calibration operations described herein can be executed periodically (or on-demand), during actual operation, (e.g. in a non-test operating environment) to account for variations in temperature, frequency, aging, and/or other factors that can affect the calibrated output transmit power. In some embodiments, the saturated output power associated with the 2.4 GHz PA 110 may be the same or approximately equal to (e.g., within a 0.01% tolerance) the saturated output power associated with the 5 GHz PA 140. In other embodiments, however, the saturated output power associated with the 2.4 GHz PA 110 may be significantly different from the saturated output power associated with the 5 GHz PA 140. It is also noted that although examples refer to the 2.4 GHz WLAN module 102 and the 5 GHz WLAN module 130 comprising 2.4 GHz processing components and 5 GHz processing components respectively, embodiments are not so limited. In other embodiments, the WLAN communication device 100 can comprise WLAN modules and processing components that are configured to operate within other suitable operating frequency bands and at other operating suitable frequencies.

The saturated output power of a power amplifier (i.e., the value of $P_{SAT}$) typically does not vary significantly with changes in temperature. In some implementations, the WLAN communication device 100 can comprise an on-chip temperature sensor to monitor the operating temperature and to detect a variation in the operating temperature (if any). If a variation in the operating temperature is detected, suitable techniques can be employed to compensate for the temperature variation. Thus, if the loopback gain and the output transmit power are calibrated at one operating temperature (T1) and the actual operating temperature (T2) is determined to be different from T1, a temperature compensation unit of the WLAN communication device 100 can correct for the error by characterizing the change of gain and power with temperature.

In some implementations, a difference in modulation schemes employed can cause inaccuracies in the operation of the transmitter unit of the WLAN communication device 100, making it difficult to achieve the target transmit power. For example, the WLAN communication device 100 may be expected to achieve a target transmit power of 10 dBm. However, a different transmit power setting may have to be employed to transmit packets with different modulation schemes (e.g., an orthogonal frequency division multiplex (OFDM) packet and a complementary code keying (CCK) packet, etc.). The loopback mechanism described herein can be employed to test different types of modulation schemes, to determine the loopback gain values for the different modulation schemes, and to consequently determine different output transmit power levels for the different modulation schemes. For example, an OFDM packet can be transmitted at the target transmit power and a first received power measurement ($P_{RX1}$) associated with the OFDM packet can be measured at the output of the ADC. Next, a CCK packet can be transmitted at the target transmit power and a second received power measurement ($P_{RX2}$) associated with the CCK packet can be determined. If the first received power measurement ($P_{RX1}$) and the second received power measurement ($P_{RX2}$) are different, this can indicate that the output transmit power of the power amplifier should be varied depending on whether an OFDM packet or a CCK packet is being transmitted. Based on the first received power measurement ($P_{RX1}$) and the second received power measurement ($P_{RX2}$), a corresponding first loopback gain associated with the OFDM signal and a second loopback gain associated with the CCK packet can be determined. The difference in the loopback gains can be stored and can be subsequently used to correct the output transmit power depending on the modulation scheme associated with the packet being transmitted.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
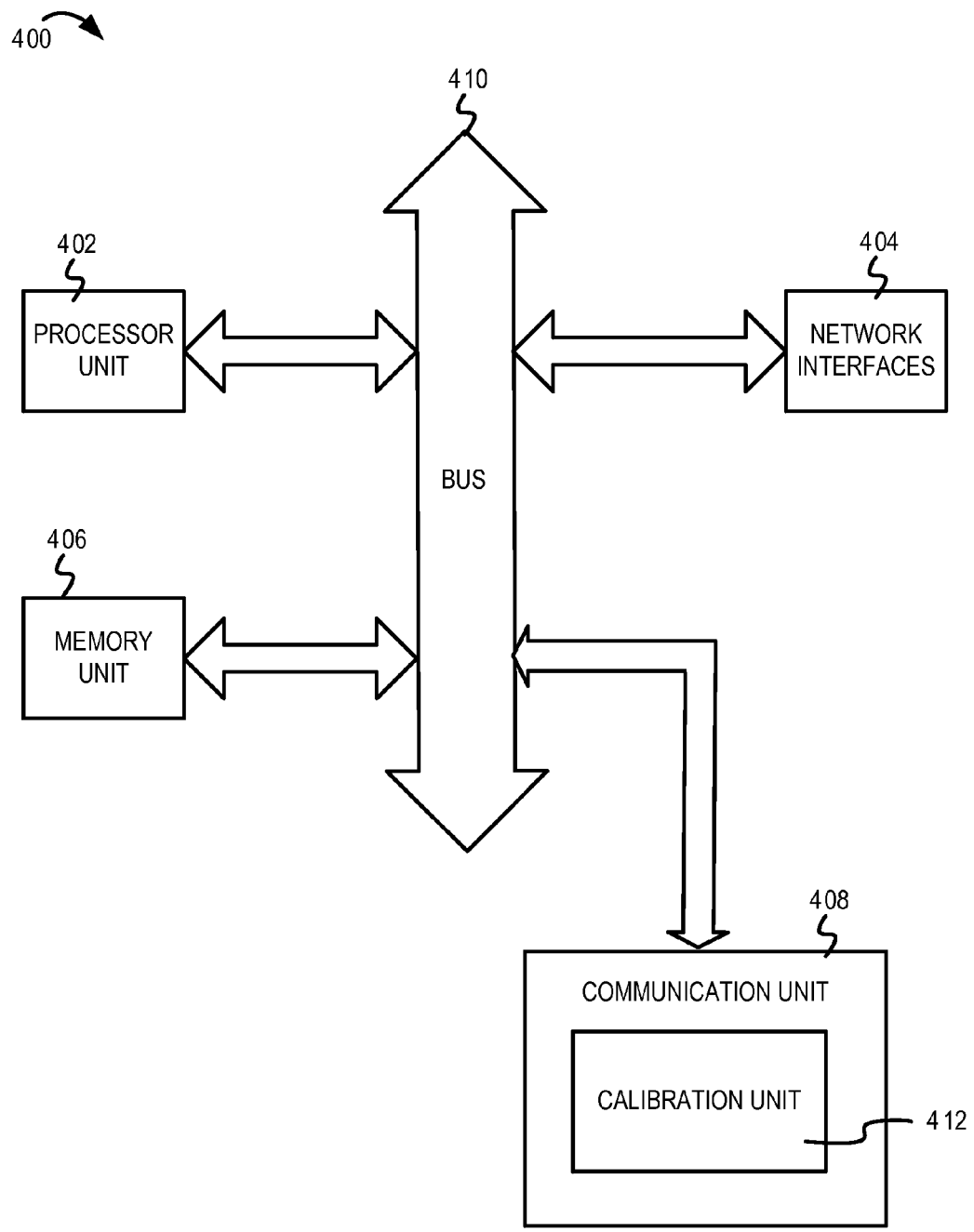
FIG. 4 is a block diagram of one embodiment of an electronic device including a mechanism for calibrating the output transmit power in the electronic device.

FIG. 4 is a block diagram of one embodiment of an electronic device 400 including a mechanism for calibrating the output transmit power in the electronic device 400. In some embodiments, the electronic device 400 can be a laptop computer, a tablet computer, a netbook, a mobile phone, a smart appliance, a gaming console, a desktop computer, or other suitable electronic device comprising wireless communication capabilities. The electronic device 400 includes a processor unit 402 (possibly including multiple processors, multiple cores, multiple nodes, and/or implementing multi-threading, etc.). The electronic device 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 400 also includes a bus 410 (e.g., PCI, ISA, PCI-Express, HyperTransport®, InfiniBand®, NuBus, AHB, AXI, etc.), and network interfaces 404 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 400 also includes a communication unit 408. The communication unit 408 comprises a calibration unit 412. The communication unit 408 including the calibration unit 412 can execute functionality for calibrating the output transmit power of the electronic device 400, as described above with reference to FIGS. 1-3. Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). For example, the communication unit 408 may comprise one or more additional processors that are distinct from the processor unit 402 coupled with the bus 410. The processor unit 402, the memory unit 406, and the network interfaces 404 are coupled to the bus 410. Although illustrated as being coupled to the bus 410, the memory unit 406 may be coupled to the processor unit 402.

While the embodiments are described with reference to various implementations and exploitations, it will be understood that these embodiments are illustrative and that the scope of the inventive subject matter is not limited to them. In general, techniques for calibrating the transmit power of a communication device as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining a saturated output power associated with a power amplifier of a communication network device, wherein the saturated output power is a maximum power level associated with the power amplifier, wherein the communication network device is configured to operate in accordance with a first operating parameter;
   providing a radio frequency (RF) signal at the saturated output power via a loopback path that couples a transmitter unit and a receiver unit of the communication network device;
   measuring a received power of the RF signal received via the loopback path;
   determining a first loopback gain associated with the communication network device based, at least in part, on the saturated output power and the received power of the RF signal received via the loopback path;
   calibrating an output transmit power of the power amplifier when the communication network device is configured to operate in accordance with the first operating parameter based, at least in part, on the first loopback gain associated with the communication network device;
   determining a second loopback gain associated with a second operating parameter when the communication network device is configured to operate in accordance with the second operating parameter;
   determining a gain difference between the first loopback gain associated with the first operating parameter and the second loopback gain associated with the second operating parameter; and
   calibrating the output transmit power of the power amplifier when the communication network device is configured to operate at the second operating parameter based, at least in part, on the gain difference and the calibrated output transmit power of the power amplifier when the communication network device is configured to operate at the first operating parameter.

2. The method of claim 1, wherein the first loopback gain associated with the communication network device is a ratio of the received power of the RF signal received via the loopback path and the saturated output power.

3. The method of claim 1, wherein said calibrating the output transmit power of the power amplifier when the communication network device is configured to operate in accordance with the first operating parameter comprises:
   providing, via the loopback path, a second RF signal at a second output transmit power of the power amplifier, wherein the second output transmit power is less than the saturated output power, wherein the communication network device is configured to operate in accordance with the first operating parameter;
   measuring a second received power of the second RF signal received via the loopback path; and
   calculating the second output transmit power of the power amplifier based, at least in part, on the first loopback gain associated with the communication network device and the second received power.

4. The method of claim 3, wherein the second output transmit power is the ratio of the second received power and the first loopback gain.

5. The method of claim 1, wherein said calibrating the output transmit power of the power amplifier when the communication network device is configured to operate in accordance with the first operating parameter further comprises:
   successively providing, via the loopback path, a plurality of RF signals at a corresponding plurality of incrementally decreasing output transmit powers of the power amplifier, wherein each of the output transmit powers is less than the saturated output power, wherein the communication network device is configured to operate in accordance with the first operating parameter;

measuring a plurality of received powers associated with corresponding ones of the plurality of RF signals received via the loopback path; and calculating the plurality of output transmit powers of the power amplifier based, at least in part, on the corresponding received power and the first loopback gain to calibrate the output transmit power of the power amplifier.

6. The method of claim 5, wherein said calculating the plurality of output transmit powers of the power amplifier based, at least in part, on the corresponding received power and the first loopback gain is to implement transmit power control at the communication network device.

7. The method of claim 1, further comprising:
receiving, at the communication network device, a second RF signal from a second communication network device of a communication network, wherein the communication network device is configured to operate in accordance with the first operating parameter;

measuring a second received power of the second RF signal received from the second communication network device;

calculating a response transmit power of the power amplifier based, at least in part, on the first loopback gain associated with the communication network device and the second received power; and transmitting a third RF signal at the response transmit power to the second communication network device in response to said receiving the second RF signal from the second communication network device.

8. The method of claim 7, wherein said calculating the response transmit power of the power amplifier is to implement transmit power control at the communication network device.

9. The method of claim 1, wherein the first operating parameter and the second operating parameter each comprise one or more of an operating frequency band, an operating temperature, and a modulation scheme.

10. The method of claim 1, wherein said determining the saturated output power associated with the power amplifier of the communication network device comprises determining the saturated output power based, at least in part, on characterization of the power amplifier.

11. The method of claim 10, wherein said determining the saturated output power comprises one or more of:
analyzing the power amplifier in a test environment to determine the saturated output power associated with the power amplifier, using a power testing device to determine the saturated output power associated with the power amplifier, or receiving a measured power in response to transmitting a test signal at the saturated output power and estimating the saturated output power associated with the power amplifier based, at least in part, on the measured power.

12. The method of claim 1, wherein said determining the second loopback gain associated with the second operating parameter when the communication network device is configured to operate in accordance with the second operating parameter comprises:
determining a second saturated output power associated with the power amplifier of the communication network device when the communication network device is configured to operate in accordance with the second operating parameter;

providing a second RF signal at the second saturated output power via the loopback path that couples the transmitter unit and the receiver unit of the communication network device;

measuring a second received power of the second RF signal received via the loopback path; and determining the second loopback gain associated with the communication network device based, at least in part, on the second saturated output power and the second received power of the second RF signal received via the loopback path, wherein the second loopback gain is associated with the second operating parameter in accordance with which the communication network device is configured to operate.

13. The method of claim 1, wherein said calibrating the output transmit power of the power amplifier when the communication network device is configured to operate at the second operating parameter comprises:
multiplying the calibrated output transmit power of the power amplifier when the communication network device is configured to operate at the first operating parameter with the gain difference to generate the output transmit power of the power amplifier when the communication network device is configured to operate at the second operating parameter.

14. A communication network device comprising:
a network interface; and
a communication unit coupled with the network interface, the communication unit configured to:
determine a saturated output power associated with a power amplifier of the communication network device, wherein the saturated output power is a maximum power level associated with the power amplifier, wherein the communication network device is configured to operate in accordance with a first operating parameter;

provide a radio frequency (RF) signal at the saturated output power via a loopback path that couples a transmitter unit and a receiver unit of the communication network device;

measure a received power of the RF signal received via the loopback path;

determine a first loopback gain associated with the communication network device based, at least in part, on the saturated output power and the received power of the RF signal received via the loopback path;

calibrate an output transmit power of the power amplifier when the communication network device is configured to operate in accordance with the first operating parameter based, at least in part, on the first loopback gain associated with the communication network device;

determine a second loopback gain associated with a second operating parameter when the communication network device is configured to operate in accordance with the second operating parameter;

determine a gain difference between the first loopback gain associated with the first operating parameter and the second loopback gain associated with the second operating parameter; and calibrate the output transmit power of the power amplifier when the communication network device is configured to operate at the second operating parameter based, at least in part, on the gain difference and the calibrated output transmit power of the power amplifier when the communication network device is configured to operate at the first operating parameter.

15. The communication network device of claim 14, wherein the first loopback gain associated with the communication network device is a ratio of the received power of the RF signal received via the loopback path and the saturated output power.

16. The communication network device of claim 14, wherein the communication unit configured to calibrate the output transmit power of the power amplifier when the communication network device is configured to operate in accordance with the first operating parameter comprises the communication unit configured to:
provide, via the loopback path, a second RF signal at a second output transmit power of the power amplifier, wherein the second output transmit power is less than the saturated output power, wherein the communication network device is configured to operate in accordance with the first operating parameter;
measure a second received power of the second RF signal received via the loopback path; and
calculate the second output transmit power of the power amplifier based, at least in part, on the first loopback gain associated with the communication network device and the second received power.

17. The communication network device of claim 16, wherein the second output transmit power is the ratio of the second received power and the first loopback gain.

18. The communication network device of claim 14, wherein the communication unit configured to calibrate the output transmit power of the power amplifier when the communication network device is configured to operate in accordance with the first operating parameter further comprises the communication unit configured to:
successively provide, via the loopback path, a plurality of RF signals at a corresponding plurality of incrementally decreasing output transmit powers of the power amplifier, wherein each of the output transmit powers is less than the saturated output power, wherein the communication network device is configured to operate in accordance with the first operating parameter;
measure a plurality of received powers associated with corresponding ones of the plurality of RF signals received via the loopback path; and
calculate the plurality of output transmit powers of the power amplifier based, at least in part, on the corresponding received power and the first loopback gain to calibrate the output transmit power of the power amplifier.

19. The communication network device of claim 14, wherein the communication unit is further configured to:
receive a second RF signal from a second communication network device of a communication network, wherein the communication network device is configured to operate in accordance with the first operating parameter;
measure a second received power of the second RF signal received from the second communication network device;
calculate a response transmit power of the power amplifier based, at least in part, on the first loopback gain associated with the communication network device and the second received power; and
transmit a third RF signal at the response transmit power to the second communication network device in response to the communication unit receiving the second RF signal from the second communication network device.

20. The communication network device of claim 14, wherein the communication unit configured to determine the saturated output power associated with the power amplifier of the communication network device comprises the communication unit configured to determine the saturated output power based, at least in part, on characterization of the power amplifier.

21. The communication network device of claim 14, wherein the communication unit configured to calibrate the output transmit power of the power amplifier when the communication network device is configured to operate at the second operating parameter comprises the communication unit configured to:
multiply the calibrated output transmit power of the power amplifier when the communication network device is configured to operate at the first operating parameter with the gain difference to generate the output transmit power of the power amplifier when the communication network device is configured to operate at the second operating parameter.

22. One or more machine-readable storage media having instructions stored therein, which when executed by one or more processors causes the one or more processors to perform operations that comprise:
determining a saturated output power associated with a power amplifier of a communication network device, wherein the saturated output power is a maximum power level associated with the power amplifier, wherein the communication network device is configured to operate in accordance with a first operating parameter;
providing a radio frequency (RF) signal at the saturated output power via a loopback path that couples a transmitter unit and a receiver unit of the communication network device;
measuring a received power of the RF signal received via the loopback path;
determining a first loopback gain associated with the communication network device based, at least in part, on the saturated output power and the received power of the RF signal received via the loopback path;
calibrating an output transmit power of the power amplifier when the communication network device is configured to operate in accordance with the first operating parameter based, at least in part, on the first loopback gain associated with the communication network device;
determining a second loopback gain associated with a second operating parameter when the communication network device is configured to operate in accordance with the second operating parameter;
determining a gain difference between the first loopback gain associated with the first operating parameter and the second loopback gain associated with the second operating parameter; and
calibrating the output transmit power of the power amplifier when the communication network device is configured to operate at the second operating parameter based, at least in part, on the gain difference and the calibrated output transmit power of the power amplifier when the communication network device is configured to operate at the first operating parameter.

23. The machine-readable storage media of claim 22, wherein the first loopback gain associated with the communication network device is a ratio of the received power of the RF signal received via the loopback path and the saturated output power.

24. The machine-readable storage media of claim 22, wherein said operation of calibrating the output transmit power of the power amplifier when the communication network device is configured to operate in accordance with the first operating parameter comprises:

providing, via the loopback path, a second RF signal at a second output transmit power of the power amplifier, wherein the second output transmit power is less than the saturated output power, wherein the communication network device is configured to operate in accordance with the first operating parameter;

measuring a second received power of the second RF signal received via the loopback path; and calculating the second output transmit power of the power amplifier based, at least in part, on the first loopback gain associated with the communication network device and the second received power.

25. The machine-readable storage media of claim 24, wherein the second output transmit power is the ratio of the second received power and the first loopback gain.

26. The machine-readable storage media of claim 22, wherein said operation of calibrating the output transmit power of the power amplifier when the communication network device is configured to operate in accordance with the first operating parameter further comprises:

successively providing, via the loopback path, a plurality of RF signals at a corresponding plurality of incrementally decreasing output transmit powers of the power amplifier, wherein each of the output transmit powers is less than the saturated output power, wherein the communication network device is configured to operate in accordance with the first operating parameter;

measuring a plurality of received powers associated with corresponding ones of the plurality of RF signals received via the loopback path; and calculating the plurality of output transmit powers of the power amplifier based, at least in part, on the corresponding received power and the first loopback gain to calibrate the output transmit power of the power amplifier.

27. The machine-readable storage media of claim 22, wherein the operations further comprise:

receiving a second RF signal from a second communication network device of a communication network, wherein the communication network device is configured to operate in accordance with the first operating parameter;

measuring a second received power of the second RF signal received from the second communication network device;

calculating a response transmit power of the power amplifier based, at least in part, on the first loopback gain associated with the communication network device and the second received power; and transmitting a third RF signal at the response transmit power to the second communication network device in response to said receiving the second RF signal from the second communication network device.

28. The machine-readable storage media of claim 22, wherein said operation of calibrating the output transmit power of the power amplifier when the communication network device is configured to operate at the second operating parameter comprises:

multiplying the calibrated output transmit power of the power amplifier when the communication network device is configured to operate at the first operating parameter with the gain difference to generate the output transmit power of the power amplifier when the communication network device is configured to operate at the second operating parameter.

* * * * *